(12) United States Patent
Unger et al.

(10) Patent No.: US 6,280,041 B1
(45) Date of Patent: Aug. 28, 2001

(54) ELECTROCHROME MIRROR

(75) Inventors: Falko von Unger, Delligsen; Klaus Grosskopf, Graben-Neudorf, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/486,328

(22) PCT Filed: Aug. 24, 1998

(86) PCT No.: PCT/EP98/05352

§ 371 Date: May 8, 2000

§ 102(e) Date: May 8, 2000

(87) PCT Pub. No.: WO99/11489

PCT Pub. Date: Mar. 11, 1999

(30) Foreign Application Priority Data

Aug. 30, 1997 (DE) .............................. 197 37 978

(51) Int. Cl.$^7$ ................. G20B 5/08; G02F 1/15
(52) U.S. Cl. ............. 359/604; 359/603; 359/265
(58) Field of Search .................. 359/601–609, 359/614, 245, 247, 254, 265–274; 349/139, 147–148

(56) References Cited

U.S. PATENT DOCUMENTS

| | | | |
|---|---|---|---|
| 4,375,319 | * 3/1983 | Wada et al. | 359/267 |
| 4,917,477 | 4/1990 | Bechtel et al. | 359/604 |
| 5,151,824 | 9/1992 | O'Farrell | 359/604 |
| 5,168,387 | * 12/1992 | Asakura et al. | 359/266 |
| 5,379,146 | * 1/1995 | Defendini | 359/265 |
| 5,610,756 | * 3/1997 | Lynam et al. | 359/604 |

FOREIGN PATENT DOCUMENTS

| | | |
|---|---|---|
| 0 429 591 A1 | 7/1992 | (EP). |
| 0 614 784 A1 | 9/1994 | (EP). |
| 95/30495 A1 | 11/1995 | (EP). |
| 0 434 453 B1 | 4/1997 | (EP). |
| 2 190 760 A | 11/1987 | (GB). |

OTHER PUBLICATIONS

Patent Abstract of Japanese Application No. 62–270,925, dated Nov. 25, 1987.

* cited by examiner

*Primary Examiner*—Thong Nguyen
(74) *Attorney, Agent, or Firm*—Norris McLaughlin & Marcus

(57) ABSTRACT

Electrochromic mirrors have, as a central component, an optically active cell which comprises two plates (1, 2) which are arranged in a laminate-like fashion and which are provided in each case on the inside with a planar electrode between which an electrochromic medium (5) is located and which are connected to one another in a sealed fashion by means of a bead (6) of adhesive which runs around the edge region of the plates (1, 2) and leaves a narrow edge strip exposed. In order to ensure a secure attachment of connecting wires (8a, 8b) which does not change the dimensions of the mirror, each edge strip of the planar electrodes is divided in half into an insulated edge-strip section (11a, 11b) by means of a separating trench (9a, 9b) such that in each case the insulated edge section lies opposite with the non-insulated edge section of the other surface electrode. In each case a connecting wire (8a, 8b) is embedded in the intermediate space between these edge-strip sections by means of an electrically conductive material.

10 Claims, 2 Drawing Sheets

ELECTROCHROME MIRROR

This is a 371 of PCT/EP98/05352, having an International Filing Date Aug. 24, 1998.

DESCRIPTION

The invention relates to an electrochromic mirror having an optically active cell comprising two transparent plates which are arranged in a laminate-like fashion and which are shaped so as to correspond to the configuration of the mirror, which plates are provided, in each case on the side facing one another, with an electrically conductive electrode layer which extends over the entire surface of the plate and with which contact is made in each case with a contact wire, of which the plate facing away from the incidence of light is of mirrored design, which plates are connected to one another in a sealed fashion by means of a bead of adhesive which runs around the edge region of the plates and leaves a narrow edge strip exposed, and between which an electrochromic medium is arranged.

BACKGROUND OF THE INVENTION

Electrochromic mirrors, also referred to as electrochromic mirrors for short, have the property that they change their reflectivity under the influence of an electrical voltage. They are used preferably in the car industry, in particular as automatically dipping rearview mirrors in motor vehicles.

Such automatically dippable rearview mirrors improve traffic safety when driving at night by reducing eye strain, and help to avoid accidents.

When the driver is in a dark environment, his pupil operates like a camera shutter which is in a wide-open setting, in order to supply the optic nerve with as many light signals as possible. In this state, the eye reacts extremely sensitively to a sudden incidence of harsh light. The light which conventional rearview mirrors reflect from the headlamps of vehicles which are overtaking or following dazzles the driver to such an extent that his ability to see is severely reduced for an instant. For fractions of a second, the driver is virtually blind as a result of the optical after-effects of the blinding light and his reaction time to obstacles which are becoming visible on the carriageway in front of him is increased by more than a second.

In systematic braking distance measurements, this so-called Troxler effect led, fore example, to a doubling of the braking distance of a passenger car under test under night driving conditions at 100 km/h on a dry carriageway.

All persons driving at night are affected by this irrespective of their sex, age or eye colour. This effect constitutes, for night driving, a risk factor which is hardly adequately compensated by conventional, mechanically adjustable anti-dazzle interior mirrors. When the interior mirror is tilted, the reflection is reduced from approximately 90% to 4%. The low residual reflection of the tilted interior mirror reduces the dazzling effect but still makes it possible only to recognize the headlamps and not the contours of the vehicles which are overtaking or following. In exterior mirrors which are curved in the most common way, such a tilting feature as an anti-dazzle protection for night driving is not provided.

However, this is evidently remedied by equipping motor vehicles with automatically dippable rearview mirrors whose electro-optical sensors detect the risk of dazzling instantaneously and reduce the risk in a strain-relieving fashion for the eye by sliding reduction of the mirror reflection to approximately 10% within a few seconds. When the risk of dazzling is past, the mirror reflection is increased immediately back to the starting value. This automatic interplay of darkening and lightening of the rearview mirror is repeated, without creating any fatigue phenomena, whenever there is a risk of dazzling during the entire service life of the vehicle.

In order to change the reflection behavior of the automatically dippable rearview mirror, the electrochromic behaviour of specific chemicals, which are arranged in front of the actual reflector of the electrochromic mirror, has been used for more than ten years. Some inorganic and organic electrochromic "colouring agents" change their absorption depth if they have an electric potential applied to them via adjoining electrodes.

Such reversible changes in absorption are known in a number of inorganic oxides of thin solid layers of transition metals (for example tungsten), and have been systematically researched. On the other hand, thin liquid crystal cells with organic colouring agents (for example liquid crystals or viologens) have been successfully investigated in this context. For reasons of function and cost, liquid crystal cells with viologens have become adopted for commercially available electrochromic mirrors.

These cells, referred to below as optically active cells, form the heart of the electrochromic mirror. They are typically composed of two plates which are shaped to correspond to the mirror configuration and are preferably made of glass, i.e., a front glass and a rear glass, which are connected to one another spaced apart and sealed off from the surroundings along their circumference. Between the two plates there is the electrochromically active medium, in particular a liquid with viologens. Each plate is provided in each case on the side facing the electrochromic medium with an electrically conductive electrode layer which covers the entire plate surface and to which in each case a connecting wire is attached. On the rear glass there is the "actual" mirrored layer.

If a voltage is applied to the two connecting wires and the associated planar electrode, for example the voltage generated by a light sensor owing to the light of a passenger car travelling behind, the absorption depth of the electrochromic medium arranged in front of the mirror plate, and thus the reflectivity of the optically active cell, changes.

These relationships are the prior art and have been disclosed in numerous documents.

A particular problem with such a typical cell is the formation of mutually insulated contacts between the connecting wires and the associated planar electrode since the planar electrodes lie one on top of the other in congruency, only being separated by a very narrow gap of approximately 0.1 to 0.2 mm.

U.S. Pat. No. 5,151,824 has disclosed how the problem can be solved in such a way that the front and rear glass are arranged opposite with respect to one another by prescribed amounts so that on each glass an exposed zone of the planar electrode is produced which can be used for contacts. On these edge zones there is in each case an elongated contact clamp with resilient contact tongues which embrace the glass with the exposed edge zones of the planar electrodes and to which in each case the connecting wire is soldered.

As a result of the offset of the edges in the known electrochromic mirror, it is a disadvantage that, in the first instance, the edge zone of the mirror is relatively large, which is not desired. The requirements of the car industry prefers electrochromic mirrors which are virtually indistinguishable in dimensions from conventional mirrors. In addition, the spring or clamp contact is very complex and awkward to attach and also can only make contact with the planar electrode in the relatively narrow region. This has a disadvantageous effect on the speed with which the absorption depth of the electrochromic medium changes.

EP 0 434 453 B1 (=U.S. Pat. No. 5,066,112) has disclosed an electrochromic mirror of the generic type which does not have an offset of the plates of the optically effective cell or any spring contacts in the form of clamps in which an additional, conductive contact layer is applied to the planar electrode in the edge zones of the plates, including their end side, the connecting wire then being soldered to the end side.

Such an electrochromic mirror is, in the first instance, very complex to manufacture and, secondly, the end-side contact zone for attaching the connecting wire is very narrow, with the result that the latter can easily tear off and, on the other hand, also only allows a very narrow contact face, which also has negative effects on the speed at which the absorption depth of the electrochromic medium changes.

SUMMARY OF THE INVENTION

The invention is based on the object of constructing the electrochromic mirror referred to at the beginning in such a way that it is not necessary to have an offset between the edges with complex contact clamps, and nevertheless a reliable formation of contact over a large area is possible using simple means.

The object is achieved in accordance with the invention by virtue of the fact that, on the one plate in the associated electrode layer on the lower half and on the other plate in the associated electrode layer in the upper half there is formed, in each case at the level of the bead of adhesive, a separating trench which is covered by said bead and prescribes an insulated edge-strip section in the respective electrode layer, in that the one connecting wire is embedded in the intermediate space between the one insulated edge-strip section and the non-insulated edge-strip section on the electrode layer lying opposite, and the second connecting wire is embedded between the other insulated edge-strip section and the non-insulated edge-strip section on the electrode layer lying opposite, in each case by means of an electrically conductive material.

The electrochromic mirror according to the invention has congruent plates of the optically active cell, i.e. does not have any external widening of the mirror, avoids complex spring contacts and ensures a reliable and stable supply of power which covers the large surface and causes the electrochromic mirror to darken and lighten rapidly.

According to one development of the invention, the separating trench is preferably constructed by means of a laser beam. This permits the associated edge-strip section to be separated from the rest of the planar electrode by means of a very narrow intersection line.

In order to construct the plate facing away from the incident light in a mirrored fashion, there are basically two conceivable possibilities. According to a first refinement of the invention both electrode layers are composed of indium tin oxide (ITO), a mirrored layer being additionally applied to the rear of the plate facing away from the incident light.

According to the second refinement of the invention, the electrode layer which is applied to the front plate facing the incident light is made of indium tin oxide (ITO) and the electrode layer which is applied to the plate facing away from the incident light is made of a chrome/rhodium compound.

In order to define the predefined distance between the two plates of the optically active cell in an easy way, the bead of adhesive preferably contains glass beads with a diameter which corresponds to the distance to be predefined between the plates of the cell.

A series of possibilities for the conductive material which is applied in the intermediate space between the planar electrodes and in which the connecting wires are embedded is available to the person skilled in the art. Preferably, the electrically conductive material is a conductive varnish. This conductive varnish ensures not only a good electrical connection between the planar electrode and the connecting wire but also gives the cell a certain degree of stability.

As an alternative to this, the electrically conductive material in which the connecting wires are embedded may also be a setting conductive solder or the like.

According to one development of the invention, the connecting wire is preferably embedded in the electrically conductive material in each case over the entire length of the associated, non-insulated edge section. This permits a good transfer of current and thus a rapid darkening and lightening of the mirror.

In order to ensure reliable protection from the environment, the end sides of the plates of the cell are preferably sealed with an insulating and hard-setting material.

Glass, preferably float glass, but also plastic, can be used for the material of the plates of the cell.

BRIEF DESCRIPTION OF THE DRAWINGS

Further refining features and advantages of the invention emerge with reference to an exemplary embodiment illustrated in the drawing, in which:

FIG. 1 shows an exploded view of the structure of the optically active cell according to the invention as a basis of the electrochromic mirror according to the invention in conjunction with a cross-sectional view according to FIG. 2 in a ready-mounted, optically active cell along an imaginary sectional line in FIG. 1, which runs centrally and parallel to the narrow side edges of the plates of the cell.

DETAILED DESCRIPTION

Figure 1:
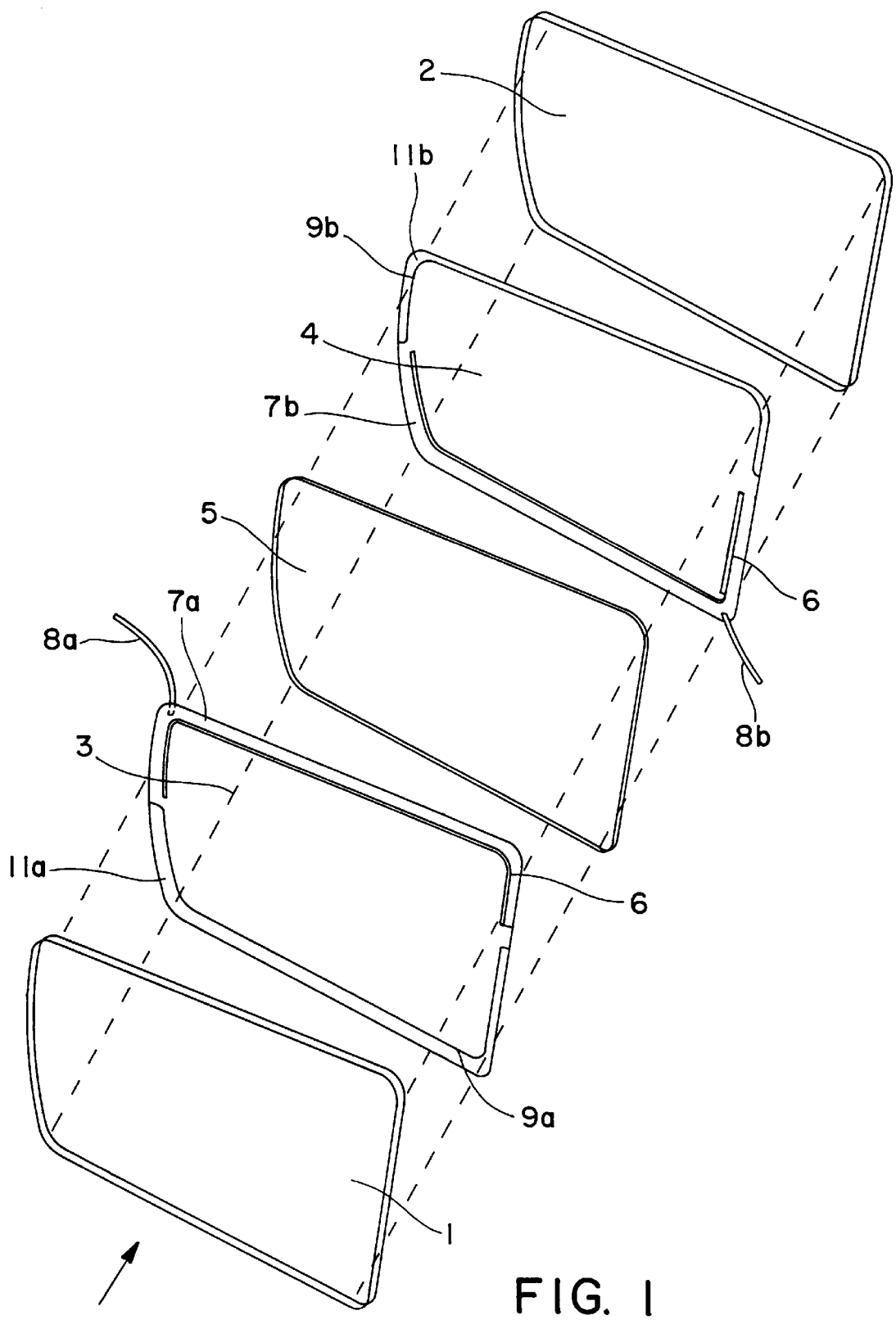
FIG. 1 shows an exploded view of the design of the optically active cell of the electrochromic mirror according to the invention.

The optically active cell of the mirror comprises two transparent flat plates which are shaped to correspond to the mirror configuration, here that of an exterior mirror of a passenger car, and comprises the exemplary embodiment glass, preferably float glass, namely the front glass 1, which is assigned to the direction of the incidence of light, and the rear glass 2.

Basically it is possible also to manufacture the plates from a transparent plastic material.

The front glass 1 is provided on the side facing away from the incident light with an electrically conductive planar electrode 3 which extends over the entire surface of the front glass 1. Likewise, the rear glass 2 is provided on the side facing the light with an electrically conductive planar electrode 4 which also extends over the entire surface of the rear glass 2.

In the present exemplary embodiment, the electrically conductive planar electrode 3 is formed by an ITO layer (indium tin oxide) which is transparent, whereas the planar electrode 4 is formed by a chromeirhodium layer which produces a mirrored surface.

There is also the possibility of an embodiment in which the planar electrode 4 is likewise formed by an ITO layer, an additional mirrored layer then being applied to the rear side of the rear glass 2.

Between the two plates 1 and 2 with their associated planar electrodes 3 and 4 there is the electrochromic medium 5, preferably in the form of an electrochromic solution of the type designated at the beginning. For this purpose, the two plates 1, 2 with the sides on which the planar electrodes 3, 4 are located are bonded to one another running around the edge in order to form an enclosed cell into which liquid can be filled. The corresponding composite adhesive, which must comprise an electrically insulating adhesive so that there is no internal short-circuit of the two planar electrodes, forms a bead 6 of adhesive, as can be seen particularly well in FIG. 2. In the case of the planar electrode 3, this bead 6 of adhesive is located on the side facing the electrochromic medium 5. Likewise, the bead 6 of the planar electrode 4 is located on the side facing the electrochromic medium 5.

The composite adhesive contains small glass beads which prescribe the distance between the two cell walls, which is typically in the region of 0.1 to 0.2 mm.

Figure 2:
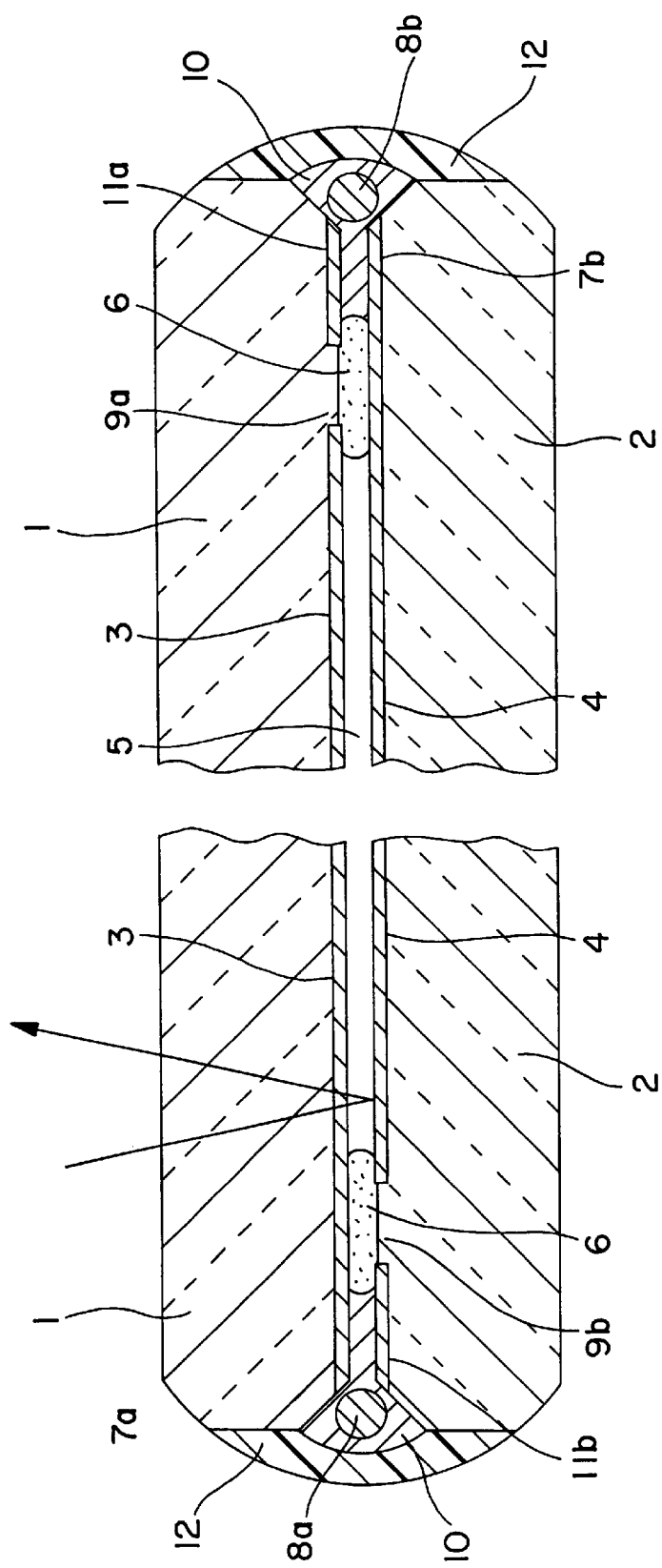
FIG. 2 shows a highly enlarged cross-sectional view of the layered structure of the ready-mounted, optically active cell with the contacts to the connecting wires.
Figure 3:
FIG. 3 is a cross-sectional view of plate 2, showing mirrored layer 13 applied to the rare surface of plate 2.

In the case of the planar electrode 3 assigned to the front glass, the bead 6 of adhesive forms an electrically conductive edge strip 7a, and in the case of the planar electrode 4 which is assigned to the rear glass 2 it forms an electrically conductive edge zone 7b. A connecting wire 8a is attached to the edge zone 7a, and a connecting wire 8b is attached to the edge zone 7b. In order that, as is shown by FIG. 2, it is possible to make contact to the contact strip 7a and 7b over a large surface, filling the intermediate space between the plates 1 and 2 with their planar electrodes 3 and 4, by means of a conductive varnish, solder or some other conductive paste 10 in which in each case the connecting wire 8a, 8b is embedded, insulating means must be provided between the planar electrodes 3 and 4 which lie one on top of the other in a congruent fashion. This insulation is provided by separating trenches 9a and 9b which are each formed spatially opposite the beads 6 of adhesive on the other planar electrode, so that, as is clear from FIG. 2, the insulating bead 6 of adhesive respectively covers the separating trench 9a and 9b so that, as a result of the filling of the edge zones of the electrode faces between the glasses only the outer edge region 11a, 11b of the respectively opposite planar electrode is covered, but not the part of this planar electrode lying in the interior.

The separating trenches 9a, 9b are expediently formed by means of a laser, preferably by means of a neodym YAG laser. As is clear from FIG. 1, the laser-separating trench 9a on the transparent electrode 3 on the lower edge extends as far as somewhat below the center. It insulates an edge strip 11 a on which the electric contact to the reflecting electrode 4 lying opposite is located. In this reflecting electrode 4 the laser-separating trench 7b on the upper edge extends on both sides as far as somewhat below the center. It insulates an edge strip 11b on which the electric contact on the transparent electrode 3 lying opposite is located. In this way, the planar electrodes 3, 4 are provided with two connecting wires 8a and 8b which are electrically insulated from one another and which, owing to their being surrounded by a conductive medium, are in intimate and mechanically stable contact with their associated planar electrodes.

If the optically active cell is filled with the electrochromic solution 5, its light-transmission can be changed by applying an electrical potential between the planar electrodes 3, 4. For this purpose, the two planar electrodes are electrically insulated from one another and connected to a DC voltage source with the connecting wires 8a and 8b.

In order to avoid an internal short-circuit, the conductive varnish 10 is interrupted by an insulating material in each case at the junctions between the insulated edge strip 11a, 11b and the non-insulated edge strip.

As is clear from FIG. 2, the edge between the two bonded-together plates 1, 2 is provided with a seal 12 which hermetically closes off the interior of the optically active cell from the surroundings.

The thickness of the plates 1, 2 is in the region between 1 to 2 mm, whereas the electrode layers typically have a thickness in the order of magnitude of 1000 angstrom. The width of the edge strips 7a, 7b and 11a, 11b is in the order of magnitude of 0.8 mm.

Instead of an ITO layer, the transparent planar electrode can also be formed by means of a tin layer or tin oxide layer.

The optically active cell can be held in an appropriate mirror mount with known structures, for example as is presented in U.S. Pat. No. 5,151,824 referred to at the beginning.

What is claimed is:

1. Electrochromic mirror having an optically active cell comprising a front transparent plate and a rear transparent plate which are arranged in a laminate-like fashion, each having an upper half and a lower half, and which plates are each provided, on that side which faces the other plate, with an electrically conductive electrode layer which extends over the entire surface of said side of said plate and with which contact is made in each case with a contact wire of which the rear plate is of mirrored design, which plates are connected to one another in a sealed fashion by means of a bead of adhesive which runs around each plate adjacent to the edges thereof and leaves a narrow edge strip exposed, and between which an electrochromic medium is arranged, wherein, on one of said plates, in the associated electrode layer on the lower half thereof and on the other of said plates in the associated electrode layer in the upper half thereof, there is formed a separating trench which is covered by said bead and prescribes an insulated edge-strip section in the respective electrode layers, and wherein one contact wire is embedded in the space between the one insulated edge-strip section and the non-insulated edge-strip section on the electrode layer lying opposite, and the second contact wire is embedded between the other insulated edge-strip section and the non-insulated edge-strip section on the electrode layer lying opposite, in each case, by means of an electrically conductive material.

2. Mirror according to claim 1, wherein the separating trench is formed in each case by means of a laser beam.

3. Mirror according to claim 1, wherein both electrode layers are made of indium tin oxide (ITO) and a mirrored layer is additionally applied to that side of the rear plate which faces away from the front plate.

4. Mirror according to claim 1, wherein the electrode layer which is applied to the front plate is made of indium tin oxide (ITO), and the second electrode layer which is applied to the rear plate is made of a chrome/rhodium compound.

5. Mirror according to claim 1, wherein the bead of adhesive contains glass beads with a diameter which corresponds to a predetermined distance between the plates of the cell.

6. Mirror according to claim 1, wherein the electrically conductive material in which the contact wires are embedded is a hard-setting conductive varnish.

7. Mirror according to claim 1, wherein the electrically conductive material in which the contact wires are embedded is a setting conductive solder.

8. Mirror according to claim 1, wherein the connecting wires are embedded in the electrically conductive material in each case over the entire length of the associated, non-insulated edge section.

9. Mirror according to claim 1, wherein said plates each have a top side, a bottom side and two edge sides and wherein the end sides of the plates of the optically active cell are sealed with an insulating and hard-setting material.

10. Mirror according to claim 1, wherein the plates of the optically active cell are made of float glass.

* * * * *

UNITED STATES PATENT AND TRADEMARK OFFICE
CERTIFICATE OF CORRECTION

PATENT NO.    : 6,280,041 B1
DATED         : August 28, 2001
INVENTOR(S)   : Falko von Unger et al.

It is certified that error appears in the above-identified patent and that said Letters Patent is hereby corrected as shown below:

<u>Title page,</u>
Item [56], FOREIGN PATENT DOCUMENTS, change;
"0 429 591 A1" to -- 0 492 591 --

Signed and Sealed this

Eighth Day of April, 2003

JAMES E. ROGAN
*Director of the United States Patent and Trademark Office*